United States Patent Office 2,745,881
Patented May 15, 1956

2,745,881

PREPARATION OF ASYMMETRICAL BISPHENOLS

Raymond H. Rigterink, Midland, Mich., assignor to The Dow Chemical Company, Midland, Mich., a corporation of Delaware No Drawing. Application March 24, 1952,
Serial No. 278,297

6 Claims. (Cl. 260—619)

The invention relates to an improved method for the preparation of asymmetrical bis-phenols.

It is known that asymmetrical halogenated, alkyl bis-phenols may be prepared by reacting a halogenated alkyl phenol with a halogenated saligenin-type compound in the presence of an acid condensing agent such as sulphuric acid. Yields of bisphenol obtained from this reaction are quite poor. Furthermore, the reaction is time consuming, and impractical for commercial use. The preparation of asymmetrical bisphenols in high yield by a practical and efficient process is much to be desired.

An object of the present invention, then, is to provide a method for the preparation of asymmetrical, halogenated alkyl bis-phenols in a practical, efficient manner and in good yield.

According to the invention, asymmetrical halogenated alkyl bisphenols are formed in a two-step process comprising the chloromethylation of a compound of the general formula:

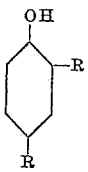

wherein one R is an alkyl group of one to four carbon atoms and the other R is one of the halogens chlorine and bromine, and the subsequent condensation of the chloromethylated alkyl halo phenol with a 2,4- or 2,4,5-halogenated phenol having the general formula:

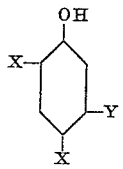

wherein each X is chlorine or bromine and Y is chlorine, bromine or hydrogen, in the presence of a catalytic amount of an aluminum halide. The resulting bisphenol is separated from the reaction mixture and may be purified according to conventional methods. The product has the general formula:

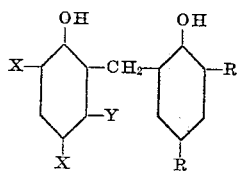

The alkyl halophenols employed in the first step of the present process may contain an alkyl radical of one to four carbon atoms and the halogen substituent may be either chlorine or bromine. Specific examples of phenols falling within the above definition are: 4-chloro-o-cresol; 2-bromo-p-cresol; 4-chloro-2-ethylphenol; 2-bromo-4-propylphenol, 4-chloro-2-isopropylphenol; 4-bromo-2-m-butylphenol; 4-chloro-2-isobutylphenol; 2-bromo-4-secondarybutylphenol; and 2-chloro-4-tertiary-butylphenol. In the chloromethylation of the alkyl halophenol, an equimolar quantity of the alkyl halophenol and formaldehyde may be reacted in the presence of an excess of hydrogen chloride. The source from which the formaldehyde is derived is not critical in the invention. Formaldehyde obtained from an aqueous 40 per cent formaldehyde solution as well as from formaldehyde-yielding substances such as methylal or paraformaldehyde are satisfactory in the present reaction. About 5 to 10 moles of hydrogen chloride per mole of the phenol may be employed to form a saturated solution of hydrogen chloride to drive the chloromethylation reaction to completion. Reaction temperatures of 25° to 100° C. and preferably 40° to 75° C. are employed for at least 1 to 2 hours until chloromethylation of the phenol is substantially complete. The chloromethylated product may then be extracted from the reaction mixture with any inert solvent such as tetrachloroethylene.

In the second step of the new process, a 2,4- or 2,4,5-halogenated phenol is reacted with the chloromethylated alkyl halophenol preferably in a halogenated or other inert solvent in the presence of a catalytic amount of an aluminum halide. Specific examples of phenols that may be used in the second step are: 2,4-dibromo- or di-chlorophenol and 2,4,5-tribromo or trichlorophenol. Such a phenol may be reacted in about an equimolecular quantity with the chloromethylated phenol obtained from the first step. The amount of the solvent such as tetrachloroethylene employed is not critical in the process as only a sufficient amount to provide a solution medium is necessary. The catalytic amount of aluminum chloride (AlCl₃) or aluminum bromide (AlBr₃) used is a small amount in the order of about 0.1 mole or slightly less per mole of the phenolic constituents present. Temperatures of about 40° to 120° C. and preferably 70° to 100° C. are employed in the second step until substantially all the hydrogen chloride has been liberated from the reaction mixture. The substituted bisphenol obtained in this manner is separated from the reaction mixture and is subsequently purified.

The invention is illustrated by the following examples, without being limited thereto:

*Example 1*

170.5 grams of 4-chloro-2-isopropylphenol, 92.4 grams of 40 percent aqueous formaldehyde and 590 grams of concentrated hydrochloric acid were mixed together in a vessel and mechanically stirred. The mixture was heated at 45° to 50° C. with stirring for twelve hours with a slow stream of hydrogen chloride bubbling through the mixture. Reaction appeared to be complete after the first two hours of heating. The mixture was cooled and 326 grams of tetrachloroethylene added with initial stirring. After the two layers separated, the lower organic layer was washed and dried. The tetrachloroethylene solution of chloromethylated phenol was added dropwise over the course of two hours to 118.5 grams of 2,4,5-trichlorophenol in 204 grams of tetra-chloroethylene mixed together with 10.6 grams of anhydrous aluminum chloride at a temperature of 90° C. The stirred mixture was maintained at a temperature of 90° to 95° C. during the addition. During the following half-hour period of heating, substantially no hydrogen chloride vapors could be observed. The reaction mixture was then cooled and to this was added a mixture of concentrated hydrochloric acid and ice to dissolve the aluminum chloride. After separation of the two layers, the lower organic layer was washed with water and then dried. On cooling the organic layer the bisphenolic product separated out. This was filtered and dried to yield 57 per cent by weight of 3',4,4',6'-tetrachloro-6-isopropyl-2,2'-methylenediphenol based on the initial 2-isopropyl-4-chlorophenol. The bisphenolic product had a melting point of 183° to 186° C.

*Example 2*

4-chloro-2-chloromethyl-6-isopropylphenol was prepared in the same manner as in Example 1. 122 grams of 2,4-dichlorophenol was stirred together with 13 grams of anhydrous aluminum chloride in 102 grams of tetrachloroethane. To this mixture, while stirring at 90° to 95° C., was added 207 grams of the solution of 4-chloro-2-chloromethyl-6-isopropylphenol in tetrachloroethylene. The dropwise addition required about two hours. After an additional half hour of heating, substantially no hydrogen chloride vapors were observed. The reaction mixture was cooled and to it was added a mixture of concentrated hydrochloric acid and ice. The lower organic layer was separated from the reaction mixture, then washed with water and dried. This was then cooled and the bisphenolic product separated out as crystals. A 67 per cent yield by weight of 4,4',6'-trichloro-6-isopropyl-2,2'-methylenediphenol was obtained based on the starting 2-isopropyl-4-chlorophenol. The bisphenolic product had a melting point of 115° to 120° C.

*Example 3*

92 grams of 2-secondarybutyl-4-chlorophenol, 46 grams of a 40 per cent formaldehyde solution and 285 grams of concentrated hydrochloric acid were stirred together at about 50° C. The reaction temperature was maintained at 45° to 50° C. and a slow stream of hydrogen chloride was bubbled through the mixture for a period of about 12 hours. The reaction was substantially complete at the end of about 2 hours. The mixture was then cooled and 163 grams of tetrachloroethylene was added with stirring. Two layers separated out from which the lower layer was removed, washed with water and then dried. The tetrachloroethylene solution of 2-secondary-butyl-4-chloro-6-chloromethylphenol was added dropwise to a mixture of 122 grams of 2,4-dichlorophenol and 13 grams of anhydrous aluminum chloride in tetrachloroethylene as in Example 2. The same conditions of reaction and subsequent separation of the bisphenolic product were employed as in Example 2. A 62 per cent yield of 6 - secondarybutyl - 4,4',6' - trichloro - 2,2' - methylenediphenol was obtained. The purified bisphenolic product had a melting point of 110 to 111° C.

*Example 4*

143 grams of 4-chloro-o-cresol, 92 grams of a 40 per cent aqueous solution of formaldehyde and 590 grams of concentrated hydrochloric acid were stirred together in a vessel at a temperature of about 45° to 50° C. with a slow stream of hydrogen chloride bubbling through the mixture. Reaction was substantially complete in 2 hours. As in the previous examples, a solution of the new 4-chloro-6-chloromethyl cresol in tetrachloroethylene was formed. This was added dropwise to a mixture of 73 grams of 2,4-dichlorophenol and 8 grams of anhydrous aluminum chloride in tetrachloroethylene at a temperature of about 90° to 95° C. with stirring. The addition required about 2 hours and the over-all reaction about 2½ hours at which time substantially no hydrogen chloride vapors could be observed. The bis-phenolic reaction product was separated and purified as described in the previous examples. An 83 per cent yield of 4,4',6'-trichloro-6-methyl-2,2'-methylenediphenol was obtained based on the weight of 2,4-dichlorophenol. The bisphenolic product had a melting point of 184° to 185° C.

*Example 5*

92.3 grams (0.5 mole) of 4-tert. butyl-2-chlorophenol, 46.3 grams (0.6 mole) of a 40 per cent aqueous solution of formaldehyde and 295 grams of concentrated hydrochloric acid were stirred together at about 50° C. The reaction temperature was maintained at 45° to 50° C. and a slow stream of hydrogen chloride was bubbled through the mixture for a period of about 12 hours. The reaction was substantially complete at the end of 2 hours. The chloromethylated 4-tertiarybutyl-2-chlorophenol was extracted with tetrachloroethylene and reacted with 122.3 grams (0.75 mole) of 2,4-dichlorophenol and 13.3 grams (0.1 mole) of anhydrous aluminum chloride. The same conditions of reaction and subsequent separation of the bisphenolic product were employed as in Example 2. A 37 per cent yield of 4-tertiarybutyl-4',6,6'-trichloro-2,2'-methylenediphenol based on the weight of 4-tertiary butyl-2-chlorophenol, was obtained. The purified bisphenolic product had a melting point of 98° to 99° C.

In a similar manner, other 2- or 4-alkyl halobisphenols may be prepared. The process of the present invention proceeds smoothly and efficiently to give a much better yield of the desired asymmetrical bisphenolic product than is obtainable by prior processes. The various brominated bisphenols may be prepared in the same way.

I claim:

1. Process for preparing alkyl, halo-asymmetrical bisphenols comprising the steps of chloromethylating a compound of the general formula:

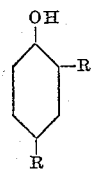

wherein one R is an alkyl group of one to four carbon atoms and the other R is one of the halogens chlorine and bromine, condensing the chloromethylated alkyl halophenolic product with an equimolar quantity of a compound of the general formula:

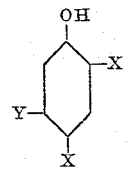

wherein the substituents X are one of the halogens chlorine and bromine and Y is selected from the group consisting of the same halogen and hydrogen, in the presence of a catalytic amount of an aluminum halide, and subsequently separating the bisphenolic product having the general formula:

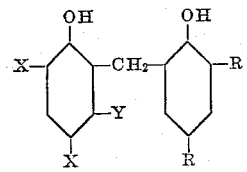

2. Process for preparing 3',4,4',6'-tetrachloro-6-isopropyl-2,2'-methylenediphenol comprising the steps of condensing 4-chloro-2-isopropylphenol with an equimolar amount of formaldehyde in the presence of an excess of hydrogen chloride, extracting the chloromethylated 4-chloro-2-isopropylphenol from the aqueous medium with an inert solvent, condensing the chloromethylated 4-chloro-2-isopropylphenol with an equimolar amount of 2,4,5-trichlorophenol in the presence of a catalytic amount of aluminum chloride, and subsequently separating the bisphenolic product.

3. Process for preparing 4,4',6'-trichloro-6-isopropyl-2,2'-methylenediphenol comprising the steps of condensing 4-chloro-2-isopropylphenol with an equimolar amount of formaldehyde in the presence of an excess of hydrogen chloride, extracting the chloromethylated 4-chloro-2-isopropylphenol from the aqueous medium with an inert solvent, condensing the chloromethylated 4-chloro-2-isopropylphenol with an equimolar amount of 2,4-dichlorophenol in the presence of a catalytic amount of aluminum chloride, and subsequently separating the bisphenolic product.

4. Process for preparing 6-secondarybutyl-4,4′,6′-trichloro-2,2′-methylenediphenol comprising the steps of condensing 2-secondarybutyl-4-chlorophenol with an equimolar amount of formaldehyde in the presence of an excess of hydrogen chloride, extracting the chloromethylated 2-secondarybutyl-4-chlorophenol from the aqueous medium with an inert solvent, condensing the chloromethylated 2-secondarybutyl-4-chlorophenol with an equimolar amount of 2,4-dichlorophenol in the presence of a catalytic amount of aluminum chloride, and subsequently separating the bisphenolic product.

5. Process for preparing 4,4′,6′-trichloro-6-methyl-2,2′-methylene-diphenol comprising the steps of condensing 4-chloro-o-cresol with an equimolar amount of formaldehyde in the presence of an excess of hydrogen chloride, extracting the chloromethylated 4-chloro-o-cresol from the aqueous medium with an inert solvent, condensing the chloromethylated 4-chloro-o-cresol with an equimolar amount of 2,4-dichlorophenol in the presence of a catalytic amount of aluminum chloride, and subsequently separating the bisphenolic product.

6. Process for preparing 4-tertiarybutyl-4′,6,6′-trichloro-2,2′-methylenediphenol comprising the steps of condensing 4-tertiarybutyl-2-chlorophenol with an equimolar amount of formaldehyde in the presence of an excess of hydrogen chloride, extracting the so-formed chloromethylated 4-tetriarybutyl-2-chlorophenol from the aqueous medium with an inert solvent, condensing the chloromethylated product with an equimolar amount of 2,4-dichlorophenol in the presence of a catalytic amount of aluminum chloride, and subsequently separating the bisphenolic product.

References Cited in the file of this patent

UNITED STATES PATENTS

| | | |
|---|---|---|
| 2,028,043 | Britton et al. | Jan. 14, 1936 |
| 2,165,956 | Brunner | July 11, 1939 |
| 2,597,717 | Faith | May 20, 1952 |

OTHER REFERENCES

Ziegler et al.: Monat. fur Chemie, vol. 78 (1948), pgs. 334–342.